United States Patent [19]
Martucci et al.

[11] Patent Number: 5,927,349
[45] Date of Patent: Jul. 27, 1999

[54] COMPOUNDING ASSEMBLY FOR NUTRITIONAL FLUIDS

[75] Inventors: James P. Martucci, Libertyville; James R. Hitchcock, Barrington, both of Ill.; Aleandro Di Gianfilippo, Scottsdale, Ariz.; Thomas R. Lillegard, Crystal Lake, Ill.

[73] Assignee: Baxter International Inc., Deerfield, Ill.

[21] Appl. No.: 08/762,578

[22] Filed: Dec. 9, 1996

[51] Int. Cl.⁶ .................................................. B65B 3/30
[52] U.S. Cl. .............................. 141/83; 141/94; 141/104; 222/52; 73/61.43; 73/61.61; 324/71.1; 324/425; 324/444
[58] Field of Search ................................ 141/9, 83, 94, 141/100, 104; 222/52; 73/61.43, 61.44, 61.61; 324/425, 444, 71.1

[56] References Cited

U.S. PATENT DOCUMENTS

| | | |
|---|---|---|
| 3,155,898 | 11/1964 | Chope . |
| 3,233,173 | 2/1966 | Lees et al. . |
| 3,643,507 | 2/1972 | Garrett .................................... 73/61.61 |
| 3,774,238 | 11/1973 | Hardway, Jr. . |
| 4,074,184 | 2/1978 | Dechene et al. . |
| 4,227,151 | 10/1980 | Ellis et al. . |
| 4,266,188 | 5/1981 | Thompson ............................. 73/61.61 |
| 4,410,981 | 10/1983 | Flory . |
| 4,467,844 | 8/1984 | Di Gianfilippo et al. ................ 141/83 |
| 4,475,666 | 10/1984 | Bilbrey et al. . |
| 4,484,135 | 11/1984 | Ishihara et al. ......................... 324/71.1 |
| 4,513,796 | 4/1985 | Miller et al. .............................. 141/83 |
| 4,590,431 | 5/1986 | Anderson et al. . |
| 4,648,430 | 3/1987 | DiGianfilippo et al. . |
| 4,653,010 | 3/1987 | Figler et al. . |
| 4,696,671 | 9/1987 | Epstein et al. . |
| 4,712,590 | 12/1987 | DiGianfilippo . |
| 4,745,953 | 5/1988 | Kobayashi et al. ....................... 141/83 |
| 4,751,476 | 6/1988 | Meijer . |
| 4,769,001 | 9/1988 | Prince . |
| 4,807,676 | 2/1989 | Cerny et al. ............................. 141/98 |
| 4,838,323 | 6/1989 | Watts ....................................... 141/83 |
| 4,896,099 | 1/1990 | Suzuki . |
| 4,899,101 | 2/1990 | Porges . |
| 4,924,702 | 5/1990 | Park . |
| 4,925,444 | 5/1990 | Orkin et al. . |
| 4,928,065 | 5/1990 | Lane et al. . |
| 4,935,207 | 6/1990 | Stanbro et al. . |
| 5,033,644 | 7/1991 | Tentler . |
| 5,040,699 | 8/1991 | Gangemi . |
| 5,056,568 | 10/1991 | DiGianfilippo et al. . |
| 5,068,617 | 11/1991 | Reich . |
| 5,187,444 | 2/1993 | Kumada et al. . |
| 5,208,544 | 5/1993 | McBearty et al. . |
| 5,209,275 | 5/1993 | Akiba et al. ............................ 141/83 |
| 5,213,142 | 5/1993 | Koch et al. .............................. 141/98 |
| 5,239,860 | 8/1993 | Harris et al. . |
| 5,255,656 | 10/1993 | Rader et al. . |
| 5,260,665 | 11/1993 | Goldberg et al. . |
| 5,266,899 | 11/1993 | Bull et al. . |

(List continued on next page.)

FOREIGN PATENT DOCUMENTS 0721103  7/1996  European Pat. Off. .

*Primary Examiner*—J. Casimer Jacyna
*Attorney, Agent, or Firm*—Jeffrey C. Nichols; Mark J. Bunaiuto; Francis C. Kowalik

[57] ABSTRACT

An mixing assembly which transfers a number of nutritional fluids from individual source containers into a collection container while noninvasively sensing the type of fluid being transferred is provided. The mixing assembly utilizes a transfer set to establish fluid communication between the source containers and the collection container. A sensing assembly is configured to noninvasively sense a number of the types of fluid flowing through the transfer set to help to prevent improper mixing. For other fluids for which the sensing assembly alone may not be able to distinguish with the desired accuracy, the mixing device utilizes a method to approximate the flow rate of that fluid with the flow rate also providing an indication of that type of fluid. By combining the output of the sensing assembly with the flow rate determination, additional fluids can be identified.

12 Claims, 9 Drawing Sheets

U.S. PATENT DOCUMENTS

| | | |
|---|---|---|
| 5,289,132 | 2/1994 | Oskman et al. . |
| 5,296,843 | 3/1994 | Wohlstein et al. . |
| 5,304,126 | 4/1994 | Epstein et al. . |
| 5,317,506 | 5/1994 | Coutre et al. . |
| 5,373,244 | 12/1994 | Marrelli ................................ 73/61.44 |
| 5,404,920 | 4/1995 | Custer ..................................... 141/83 |
| 5,464,392 | 11/1995 | Epstein et al. . |
| 5,496,273 | 3/1996 | Pastrone et al. . |
| 5,503,624 | 4/1996 | Roeher et al. . |
| 5,507,412 | 4/1996 | Ebert et al. . |
| 5,510,621 | 4/1996 | Goldman . |
| 5,522,798 | 6/1996 | Johnson et al. . |
| 5,609,576 | 3/1997 | Voss et al. . |
| 5,612,622 | 3/1997 | Goldman et al. ....................... 324/444 |
| 5,616,124 | 4/1997 | Hague et al. . |
| 5,630,799 | 5/1997 | Beiser . |
| 5,645,531 | 7/1997 | Thompson et al. . |
| 5,653,681 | 8/1997 | Ellingboe . |

FIG. 4
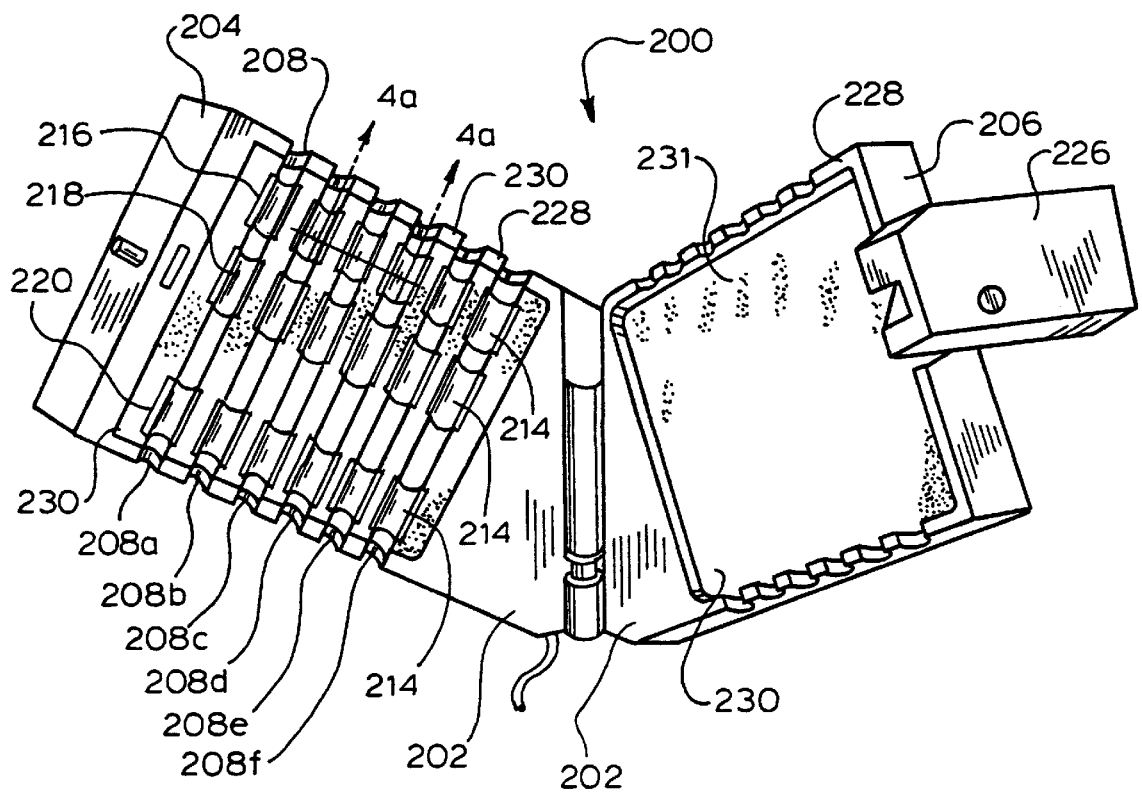
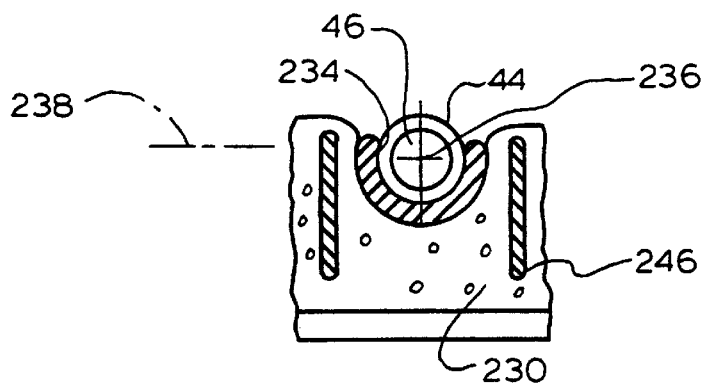
FIG. 4a

COMPOUNDING ASSEMBLY FOR NUTRITIONAL FLUIDS

BACKGROUND OF THE INVENTION

The present invention relates to assemblies for transferring a plurality of individual fluids from multiple source containers into a collecting container, and specifically relates to such an assembly which controllably transfers the individual fluids to a collecting container in at least partial dependence on a determination of the type of the transferred fluids.

In many instances, an individual must be fed by administration of a nutritional solution to that patient. For example, such feeding may be accomplished by administration of a nutritional solution directly to a patent's digestive system or by administration of a solution into a patients intravenous system. Frequently, the desired solution to be administered will vary between individuals, and in many settings, such as hospitals or other care giving facilities, there may be a sizable number of individuals needing such solutions. Therefore, it is desirable that these solutions are prepared in a safe, efficient and accurate manner.

There are several devices which are designed to compound a desired nutritional solution in a collection container by varying the amount of each of a number of nutritional components which are added to the container. One such exemplary device is the Automix® compounder sold by Baxter Healthcare Corporation of Deerfield, Ill.

In one method of utilizing such devices, a pharmacist or nutritional caregiver will determine the nutritional solution which is to be administered and specify the desired quantity of each of the nutritional components which are needed to form the desired solution. This information will then be utilized to compound the desired solution. A number of source containers of the various individual nutritional components may be clustered about and connected to the collection container for the nutritional solution. A desired quantity of one or more of the components is then transferred from the source containers to the collection container in a controlled manner. Upon completion the collection container is disconnected and eventually transported to the individual for administration.

As can be appreciated, it is highly desirable that the compounding method add the nutritional components to the collection container in an accurate manner. In one example, the method may utilize a compounder which transfers, in a controlled manner, the desired quantities of the nutritional components to the collection container. Although the compounder may be properly instructed to make the nutritional solution, an accurate determination of the quantity and the type of component being added to the container during the transferring process is also desirable.

To promote sterility of the nutritional solution, surfaces which come into contact with any of the nutritional fluids must be kept clean. To implement this requirement, compounding devices frequently utilize a sterile disposable apparatus or transfer set for connecting the containers housing the sterile nutritional components to the collection container. At appropriate times, the transfer set will be replaced, with the replaced set properly disposed of.

These transfer sets, however, may make it difficult to use fluid sensors which must contact a fluid to distinguish the different types of fluids in the compounding method. Thus, typically if transfer sets are used, it is highly desirable that the compounding apparatus be operable without utilizing sensors which require contact with the fluid to function properly.

Generally, in compounding solutions such as nutritional solutions, the type of source solution in a particular container is one of the inputs to the compounder. However, in some instances, there may be a possibility that the type of solution is input incorrectly. It would be highly desirable to have a compounder that independently verifies the type of solution which flows from a particular container so that any errors may be detected.

One type of sensing system which may find use in compounding methods is disclosed in published European Patent Application No. EP 721,103 entitled "APPARATUS FOR IDENTIFYING CONTAINER COMPONENTS USING ELECTRICAL CONDUCTIVITY". However, it has been found that with such a system distinguishing between two or more of the fluids which are typically used in nutritional compounding methods may be difficult. Thus other types of sensing systems or processes may be desirable.

It is therefore an object of the present invention to provide an assembly for transferring component fluids from a plurality of individual source containers to a receiving or collection container. A related object is to provide such an assembly which controllably transfers desired volumes of the component fluids and compounds a desired nutritional solution in a collection container in at least partial dependence on a determination of the type of the fluids being transferred.

Another object of the present invention is to provide an assembly for individually transferring and compounding a number of predetermined nutritional solutions in a collection container in an efficient and accurate manner.

A further object of the present invention is to provide an assembly for transferring a plurality of component fluids and compounding a desired solution by adding in a controlled manner the components to a collection container to form the desired solution. A related object is to provide as an input to such a compounding process, the type and amount of components which have been transferred to the collection container.

Yet another object of the present invention is to provide an assembly for transferring component fluids with the assembly adapted to utilize a disposable transfer set to connect source component containers to a receiving or collection container. A related object is to provide such an assembly having sensors uniquely suited to operate with such a set and without requiring contact with fluids during the compounding process.

A still further object of the present invention is to provide an assembly for transferring component fluids and compounding a desired solution, with the assembly having the ability to check the type of component fluid being transferred during the compounding process. A related object is to provide such an assembly where the types of component fluids being transferred are input into the system and the compounding assembly independently checks the type of component solutions during the compounding process.

SUMMARY OF THE INVENTION

The present invention provides an assembly which controllably transfers component fluids from a plurality of individual source containers through a transfer set to form or compound a desired mixture in a collection container while determining or sensing the type of fluid being transferred. The identified component fluid type may then be compared with the desired fluid type to verify that the fluid being transferred matches the desired fluid.

To this end, the transferring assembly of the present invention includes a sensing assembly which is in sensory contact with the component fluid as the fluid flows through the transfer set and provides a distinguishing characteristic of the solution being transferred.

In an embodiment, the sensing assembly is in noninvasive sensory contact with the component fluid during flow. The distinguishing characteristic provided by the sensing assembly accurately identifies at least one of the component fluids without the necessity of further input. In a further embodiment, the transferring assembly identifies a distinguishing characteristic which may correspond to a plurality of fluid types. Then, if the distinguishing characteristic is insufficient to identify the particular fluid, the transferring assembly examines an additional input characteristic of at least one of the component solution types and identifies the component fluid with the desired accuracy.

In an embodiment the mixing assembly includes a pump operatively acting on at least one of the component fluids within the transfer set to force a flow of that fluid along at least a portion of the transfer set. The rate of the flow particularly within the transfer set, varies in at least partial dependence on a distinguishing characteristic of the fluid. The mixing assembly further includes the ability to determine the differences between the flow rates of the component fluids thereby providing a further distinguishing characteristic of the component fluid flowing through the transfer set.

In an embodiment, the sensing assembly includes a plurality of sensors which are disposed in close proximity to tubing forming a part of the transfer set. A signal transmitted by one of the sensors is received by a second sensor, and the received signal is indicative of a distinguishing characteristic of the fluid within the tubing.

In an embodiment, the mixing assembly includes a weight sensor operatively contacting a collection container to distinguish between varying flow rates of different component solution by measuring weight change of the container over a predetermined time interval.

BRIEF DESCRIPTION OF THE DRAWINGS

FIG. 4 is an elevational view of the sensor block of FIG. 2 in the open position;

FIG. 4a is a partial cross sectional view of the sensor block taken generally along line 4a—4a in FIG. 4;

DESCRIPTION OF THE PREFERRED EMBODIMENT

Figure 1:
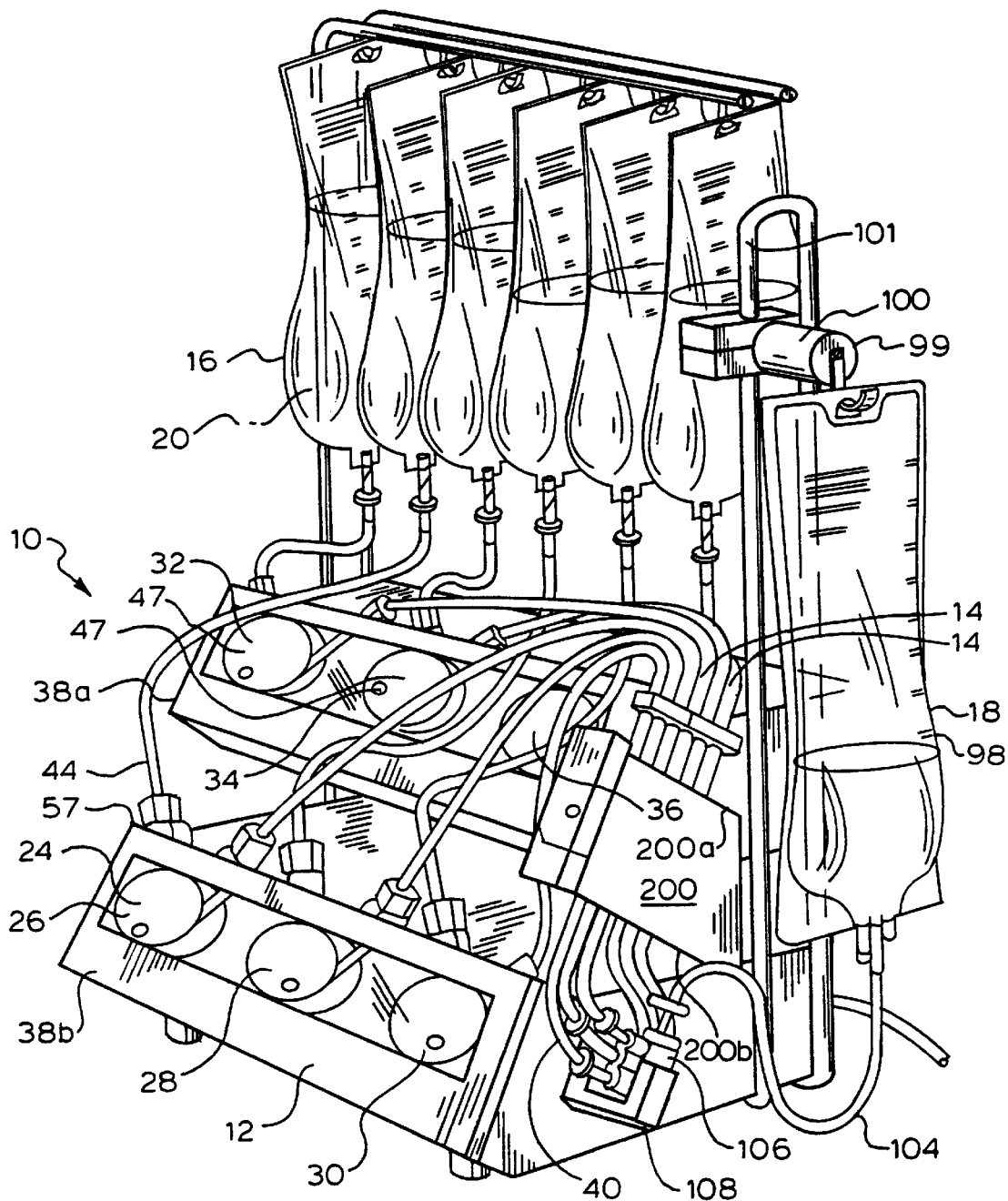
FIG. 1 is a front perspective view of a fluid transfer apparatus forming a part of a preferred embodiment of the present invention.

Referring to FIG. 1, a preferred embodiment of a fluid transfer assembly of the present invention is generally indicated at 10. The illustrated embodiment of the assembly 10 includes a pumping device 12, such as a compounder, examples of which include those compounders set forth in U.S. Pat. No. 4,712,590 entitled "ELECTRICAL CONNECTION MEANS FOR MULTIPLE BULK COMPOUNDING SYSTEMS"; U.S. Pat. No. 4,513,796 entitled "HIGH SPEED BULK COMPOUNDER"; and U.S. Pat. No. 5,228,485 entitled "FLEXIBLE TUBING OCCLUSION SENSOR", the disclosures of which are incorporated herein by reference.

The pumping device 12 is shown utilizing a transfer set 14 to place multiple source containers 16 in fluid communication with a receiver or collection container 18. In operation, individual fluids 20 within the source containers 16 are forced by at least one pump 24 forming a part of the pumping device 12, through the set 14 to the receiver container 18. Examples of the receiving container 18 include flexible bags and syringes, among others.

In the preferred embodiment, the pump 24 is a plurality of pumps, preferably six (6) peristaltic pumps 26, 28, 30, 32, 34 and 36 contained within housings 38a, 38b which are placed in a stacked relationship. The transfer set 14 includes conduits 40 formed of flexible tubing 44 arranged to form at least a portion of a fluid passageway 46 (FIG. 4a) from the individual source containers 16 to the receiver container 18. To place the pumps 24 in hydraulic contact with fluid 20 in the tubing 44, a portion of each of the tubing 44 is placed around rollers 47 which form a part of the peristaltic pump 26–36 corresponding to the individual segment.

In operation, the peristaltic pump 24 transfers fluid in a particular source container 16 to the receiving container 18 by selective rotary movement of the rollers 47. This movement causes the pump 24 to hydraulically contact the fluid 20 by compressing the 15 walls of the tubing 44 to place a positive pressure on the fluid, thereby forcing the fluid to flow along the tubing. Other pumps which hydraulically contact the fluid to create the positive pressure include syringe, or volumetric, or cassette pumps among others.

It is also envisioned that the pump 24 may include a pump which hydraulically contacts the fluid by creating a negative pressure on the fluid to force the fluid to flow along the tubing. For example, the pump 24 may create a vacuum in the collection container 18 or an intermediate chamber (not shown) to force the flow of fluid along the tubing 44.

Figure 2:
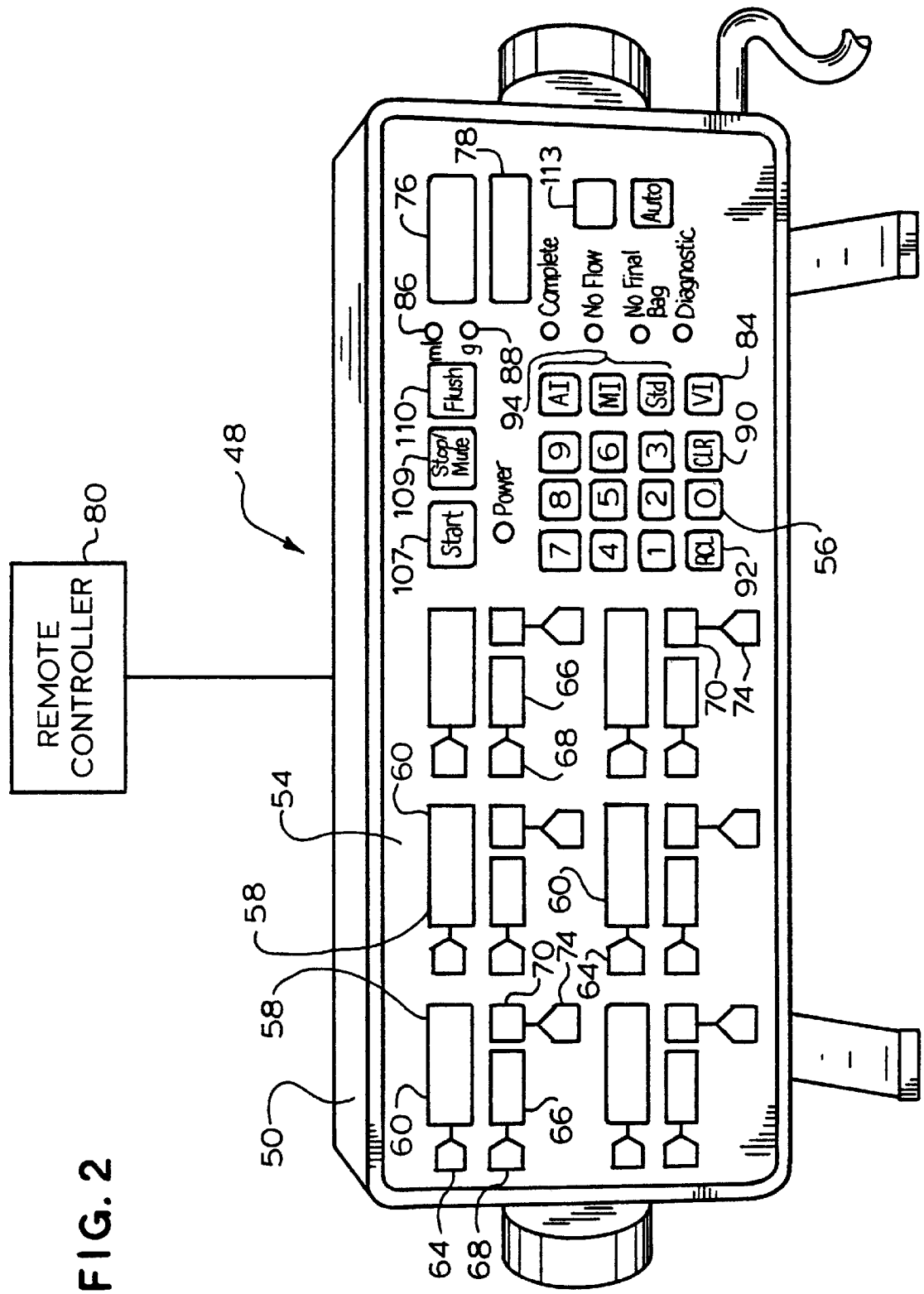
FIG. 2 is a front planar view of a controller within a control panel and forming a part of the preferred embodiment of the present invention.

Referring also to FIG. 2, in the preferred embodiment, each of the peristaltic pumps 26–36 is individually and operatively controlled by a controller indicated generally at 48. Desired quantities of component fluids are transferred by selective operation of the individual pumps 26–36 by the controller 48. The controller 48 controls the pumps 26–36 in at least partial dependence on various inputs and data which may be supplied by various sensors, a separate remote controller or the operator. Preferably the controller 48 is housed within a separate enclosure 50 wired to the housings 38a, 38b but may also be placed elsewhere, such as in one of the housings 38a or 38b. Generally the controller 48 includes at least one microprocessor connected to various combinations of volatile and nonvolatile memory.

Typically, the panel 54 has an input keypad 56, and a plurality of display stations 58 corresponding to each of the pumps 26–36. Each of the display stations 58 is also associated with one of the source containers 16 and may be color coded for identification purposes. The keypad 56 is a 16 character keypad having digits 0 through 9, a recall key (RCL) and a clear key (CLR) as well as other keys described below.

Also, each of the display stations 58 includes a volume to be delivered display 60 and corresponding entry key 64; a specific gravity display 66 and entry key 68; and a source component family display 70 and entry key 74. The control panel 54 also includes an ID display 76 for the collection container 18 and an alarm display 78.

Referring also to FIG. 2, the values for the volume to be delivered; the specific gravity; and the solution family of fluid from an individual source container 16 may be manually input or input by a remote controller 80 diagramatically represented in FIG. 4.

On one of the display stations 58, the type of component fluid to be transferred by the associated pump 26–36 is entered by pressing the entry key 74 to scroll through the various types on the display 70 until the proper type is shown.

For the volume to be delivered and specific gravity, the proper values are input using the respective entry key 64, 68 and keypad 56. Upon pressing the entry key, the displayed digits flash to indicate the entry mode of operation.

Pressing one of the other entry key 64, 68, 74 enters values which have been input and shown on the station display 58. Entry of a value stops the respective display from flashing. If a value is incorrect, the respective entry key 64, 68, 74 is pressed and then a clear key 90 is pressed to zero out the value, and the entry process is repeated.

As noted above, the input values may also be loaded into the controller 48 by a remote controller 80. An example of such an automatic method and assembly for performing such a method is described in U.S. Pat. No. 4,653,010 entitled "COMPOUNDING SYSTEM" the disclosure of which is incorporated by reference herein. To place the controller 48 in the proper mode for accepting entered input values from either the control panel 50 or remote controller 80 or a combination thereof, a corresponding one of a plurality of mode keys 94 is pressed. The mode keys 94 may include Auto I/D (AI) for when the next patient Identification in a queue is automatically downloaded from the remote controller 80. Another mode key 94 is a Manual I/D (MI) key, to query the remote controller 80 to download input values for a particular patient or prescription. A third mode key, the Standard Mode (STD) key, places the controller 48 into the mode for accepting input values entered using the control panel 50, as set forth above.

When utilizing the remote controller 80, the patient ID may be displayed on the control panel 50 utilizing the volume to be delivered display 60 of one or more of the stations 58. An identification of the collection container 18 may be displayed on the container ID display 76. Other values such as the source or component family fluid identification may also be downloaded by the remote controller. The displayed patient and collection container identification may then be checked against records (not shown). The source component fluid identification may be checked against the source component connected to that station 54 (and pump 26–36). If the operator determines that all displayed values are correct, the verify key 84 may be pressed.

Then the input values for the specific gravity and volume to be delivered for one or more of the component fluids 20 which are to be used can be downloaded from the remote controller 80 to the controller 48 and displayed on the station 58 for verification in a similar manner.

Referring back to FIG. 1, the collection container 18 such as a flexible bag 98 is operatively attached to a weighing sensor 99, preferably hung from a load cell 100, which transmits information regarding the weight of the container 18 along with any contents to the controller 48. The load cell 100 may be attached to a bracket 101 forming a part of the pumping device 12. Should the weighing sensor 99 take other forms, such as a scale (not shown), the container 18 may need to be placed on the scale to establish the operative contact.

A transfer tube 104 forming a part of the transfer set 14 may be connected to the collection bag 18 and a junction manifold 106. The junction manifold 106 also places all the tubing 44 from the individual source containers 16 in communication with each other. The ends of the tubing 44 are generally bonded to the junction manifold 106 so that the junction block forms a part of the transfer set 14. In contrast, the transfer tube 104 is removably connected to the junction manifold 106 to allow numerous collection containers to be sequentially filled by connection to a single junction manifold.

A cradle 108 is attached to the housing 38b and configured to accept the junction manifold 106 in only a predetermined desired orientation. As described later, the fit between the cradle 108 and manifold 106 promotes proper attachment of the transfer set 14 to the transferring assembly 10.

Forming a part of the transferring assembly 10, is a fluid sensing device or assembly generally indicated at 200. Preferably, the sensing assembly 200 noninvasively provides an indication of the type of fluid within each of the individual tubing 44 in fluid communication with the corresponding source containers 16.

The sensing assembly 200 operates by including, at least partially, a sensing method which is described in a basic form in the specification of U.S. Pat. No. 5,612,622 entitled "APPARATUS FOR IDENTIFYING PARTICULAR ENTITIES IN A LIQUID USING ELECTRICAL CONDUCTIVITY CHARACTERISTICS", the disclosure of which is incorporated by reference herein. The preferred method of the present invention includes sensing electrical characteristics of the tubing 44 and contents of the tubing at predetermined times and positions along the tubing and comparing the readings to produce a distinguishing characteristic of the type of fluid within the tubing.

Figure 3:
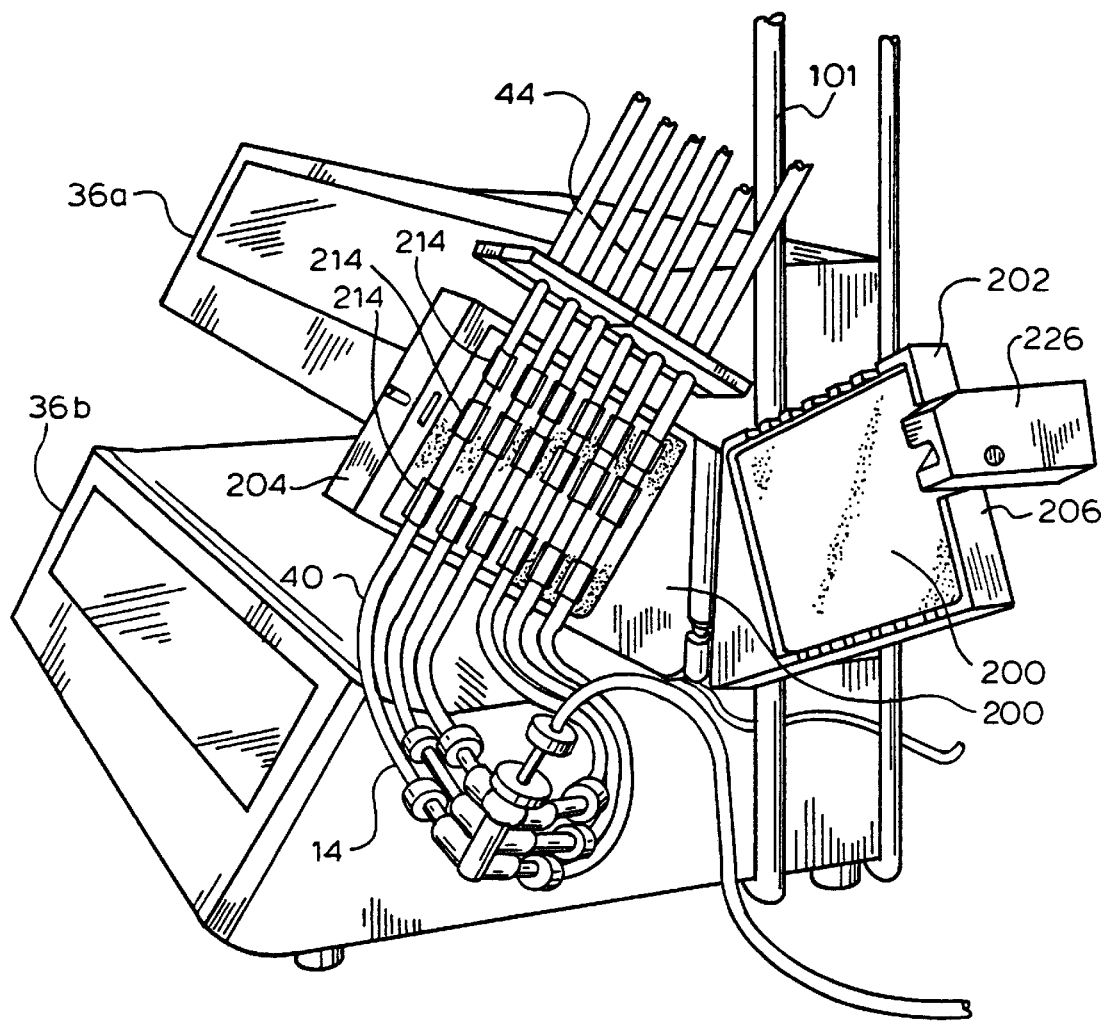
FIG. 3 is a perspective view with parts broken away of the apparatus of FIG. 1 with a sensor block forming a part of the fluid transfer apparatus shown in an open position.

Referring in particular to FIGS. 3 and 4, the sensing assembly 200 includes a housing 202 formed of a base element 204 and a cover element 206 which are attached to each other in a clamshell arrangement. When placed in the closed position (shown in FIG. 1), the base element 204 and cover element 206 define channels 208 (FIG. 4) for receiving at least a portion of the tubing 44. Because it is desirable to sense each of the fluids, tubing 44 from each of the source containers 16 extends through the corresponding pump 26–36 and along a separate channel 208a–f. The individual channels 208a–f are preferably parallel and arranged along a common plane.

Within the housing 202 and disposed along each of the channels 208 is a plurality of sensing elements 214. A transmitting element 216 is disposed along the top of each of the respective channels 208a–f. A first receiving or sensing element 218 is disposed at a first predetermined distance from the first element 216 and preferably downstream from the first element. A second receiving or sensing element 220 is disposed at a second predetermined distance from the transmitting element 216 and first receiving element 218 and preferably downstream from the receiving element.

A signal is applied by the transmitting element 214 to the tubing 44 and any fluid contents at the transmitting element. The first receiving element 218 and second receiving element 220 detect the signal after the signal has been transmitted along the tubing 44 and fluid contents. By referencing the detected signal vis-à-vis the applied signal, a distinguishing characteristic of the contents of the tubing 44 may be determined.

In the preferred embodiment of the sensing assembly 200, the signal includes a pulse forming a square wave of a predetermined frequency and voltage. This square wave may take on many values such as 5v at about 39 Kilohertz. The pulse is applied at the first sensing element 216. The first receiving element 218 and second receiving element 220 then acquire the signal. The voltage level of the acquired signal is then sampled at a first and a second discrete time after the applied pulse. By comparing the difference in the sampled voltage between the first and second time periods and the difference in the sampled voltage between the first 218 and second receiving elements 220, the distinguishing characteristic of the type of fluid may be determined. Air or the absence of liquid in the segment 40 of the tubing 44 proximate one or more of any of the sensing elements 214 is also one of the fluids having a distinguishing characteristic which may be pictured by the desired sensing method.

Although in the preferred embodiment the sensing elements 214 contact the tubing 44, it is envisioned that the sensing elements may be disposed in other positions and still function to practice the preferred method of the invention. These sensing elements 214 should be in sensory contact with the tubing and contents. The sensory contact includes disposing the transmitting element 216 and receiving elements 218, 220 so that the signal may be transmitted to the tubing 44 and contents and received from the tubing and contents in such a fashion that the distinguishing characteristic may be determined.

In other embodiments other types of signals may also be used. For example, a magnetic field or electrical pulse of a different wave form may also be used.

The sensing assembly 200 is also configured so that each channel 208a–f corresponds to one of the pumps 26–36. Thus, fluid pumped by a particular one of the pumps 26–36 is to flow through tubing received in the particular corresponding channel 208a–f.

However, it has been found that in compounding nutritional solutions for patients, there may be types of source solutions for which the characteristic of the fluid given by the described distinguishing method may not be as distinct as desired to distinguish between the solutions. For example, high concentration dextrose solutions and a solution containing branched chain amino acids may exhibit similar characteristics when exposed to the detection method. Therefore, for some fluids exhibiting similar characteristics it may be advantageous to supplement the detection method with an additional second method which distinguishes between such fluids.

One such second method is to distinguish between fluids by examining the flow rates of the fluids while the fluids are being pumped. Fluids frequently possess distinguishing physical characteristics which along with the hydraulic flow resistance found in the transfer set 18 have an effect on the flow rate of the fluid within the set. The junction manifold 106 is an example of a portion of the transfer set 14 which forms hydraulic flow resistance for the flow of fluid through the set.

For example, as may be appreciated, dextrose has a higher viscosity than a fluid containing branch chain amino acids. Thus, under similar pumping conditions, the flow rate of dextrose through the transfer set 14 will typically be lower than the flow rate of the source fluid containing branch chain amino acids.

Referring also to FIG. 1, one way the flow rate differential can be indicated is by a novel use of the weight change per unit of time of the collection container 18 as sensed by the weight sensor 99 and which occurs during pumping. By way of example, because the pumps 26–36 exhibit similar pumping characteristics, the flow rate of each of the fluids 20 through the transfer set 14 depends at least partially on the viscosity of that fluid. This variation in flow rate will be, at least partially, indicated in the difference between the weight gain per unit of time for the container 18 as it receives one type of component fluids 20 versus a second type of component fluid. Thus, the change of the weight of the container 18 per unit of time during pumping will, in many instances, vary between the various fluids, which gives an indication of the flow rate differential and thus the type of the fluid going into the container.

One particular advantage of using the sensor assembly 200 and weighing sensor 99 In the method described above, is that the identification of the fluids is accomplished by sensing devices which do not require contact with the fluid to function properly. In fact, a disposable transfer set 14 is easily accommodated by these sensing devices.

Referring back to FIGS. 3, 4 and 4a and turning now to the above-identified sensing assembly 200 in greater detail, the housing 202 is attached to the upper housing 38a. The housing 202 is preferably placed at an angle relative to horizontal to facilitate placement of the tubing 44 within the housing and opening of the housing about the bracket 101. The housing 202 includes a latching assembly 226 to retain the base element 204 and the cover element 206 in the closed position (shown in FIG. 1).

Referring to FIGS. 4 and 4a, both the base element 204 and the cover element 206 of the housing 202 include an outer shell 228 and an inner element 230. Preferably, the channels 208 are defined in the inner element 230 of the base 204 while the surface 231 of the inner element 230 of the cover 206 is generally planar. In alternate embodiments, a portion of the channel 208 may be defined in the inner element 230 of both the base 204 and cover 206.

Disposed along each of the channels are the transmitting element 216, the first receiving element 218 and the second receiving element 220. To facilitate manufacture and assembly, all of the sensing elements 214 are similarly formed. In the preferred embodiment, the sensing elements 214 are formed as a tubular segment having a "C" shaped cross section and an inner surface 234 forming an interior into which a portion of a length of the tubing 44 is inserted.

In cross section particularly shown in FIG. 4a, the inner surface 234 is generally circular and is sized to snugly fit about the tubing 44. The element 214 is formed so that a central axis 236 of the tubing 44 is interior of, or recessed relative to, a plane 238 defined by edges 240 of the inner surface 234 disposed directly opposite the tube 44. Thus, the element 214 preferably envelopes a majority of the circumference of the tube. It has been found that the tubing can be easily inserted into an opening defined by the edges 240 with the elements then removably clutching the tubing which promotes intimate contact between the sensing elements and tubing. Such contact facilitates the operation of the sensing assembly 200.

To minimize pinching or gouging of the tubing 44 by the elements 214, the outer edge 240 of the element is formed with a smooth radius. It has also been found that the surface texture of the inner surface 234 affects the elements 214 in transmitting or receiving the signals.

Although the separation between the elements 214 along a channel 208 may vary, in the preferred embodiment the transmitting element 216 is separated from the first sensing element 218 by approximately 0.2 inches, while the second sensing element 220 is separated from the transmitting element 214 by approximately 1.6 inches.

To isolate the elements from potential interference, the inner elements 230 are composed of a non-conducting polymer and the assembly 200 includes generally planar shields 246 which extend within the inner elements and generally parallel to the channels 208 and along both sides of each of the channels. It has been found that similar shielding is not necessary between the elements 216, 218 and 220 disposed along one of the channels 208.

It is also envisioned, that the sensing assembly 200 may be adapted so that the transfer tube 104 may also be passed through the sensing assembly. The sensing assembly 200 may then sense the contents of the transfer tubing. Such an arrangement may however, lead to nuisance alarming as the transfer tubing 104 will likely contain fluid from a previous pumping cycle upon the initiation of a second pump 24. Thus the controller 48 may find a mismatch. A delay may be incorporated to reduce this nuisance alarming.

Figure 5:
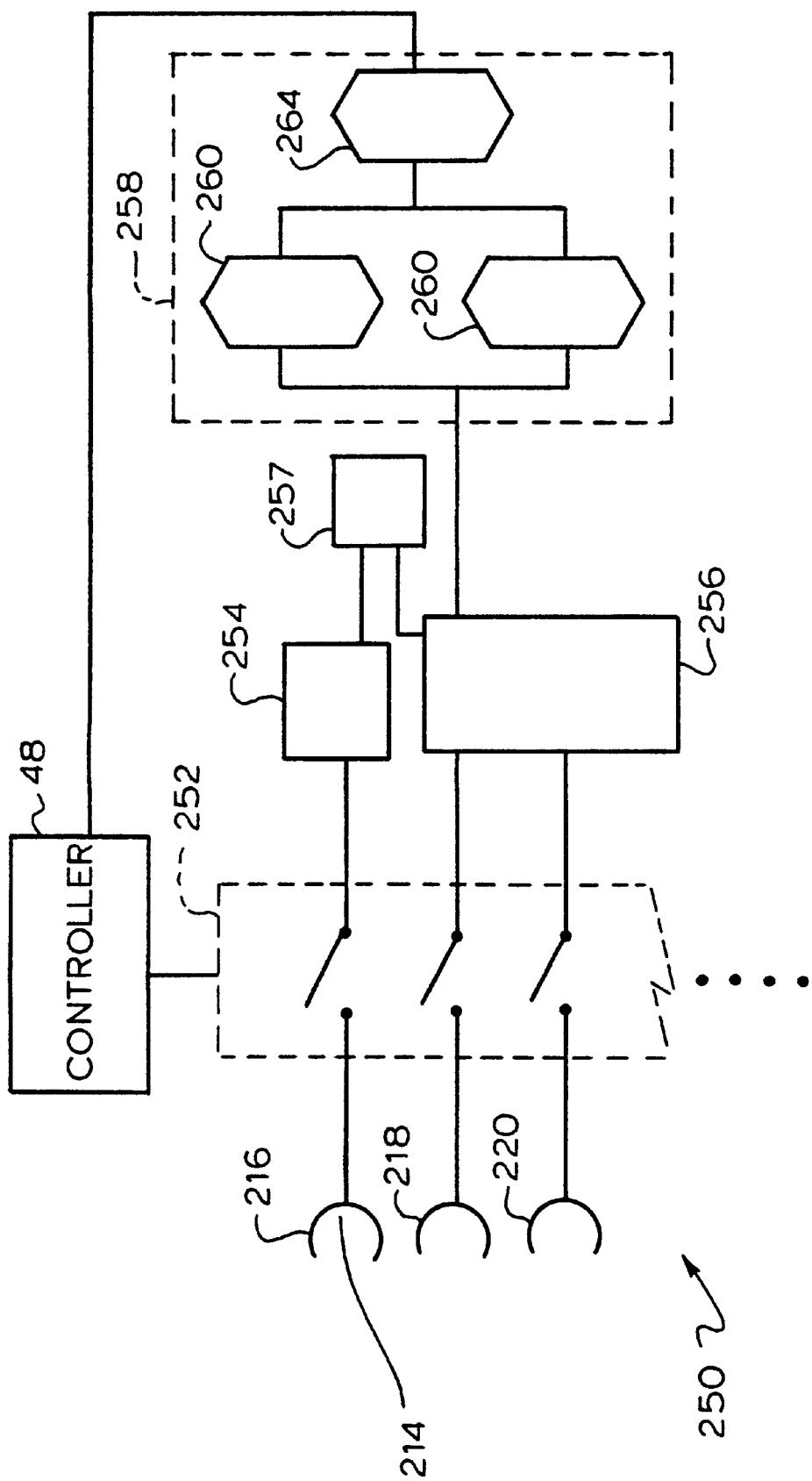
FIG. 5 is a schematic block diagram generally representing a portion of the control and operating system of the fluid transfer apparatus shown in FIG. 1.

Referring to FIG. 5, a block diagram illustrates the general layout of a preferred embodiment of the circuit, indicated generally at 250, forming a part of the sensing assembly 200. The controller 48 actuates a switching circuit 252 to activate the sensing elements 214 along a desired channel 208 to sense the fluid in the tubing 44 extending along that channel. The circuit 250 is preferably housed in the base 204 (FIG. 4). For example during operation of one of the pumps 24 (FIG. 1), the controller 48 actuates the channel 208a–f corresponding to that pump. The controller 48 generally actuates the sensory assembly 200 at predetermined times.

Upon actuation of the sensing elements 214 for the desired channel, a signal generator 254 supplies a signal, preferably a pulse consisting of a square wave of a predetermined frequency and voltage to the transmitting element 216. The signal is then transmitted by the transmitting element 216 into the tubing 44 (FIG. 1) and the contents of the tubing.

The signals received at the first receiving element 218 and second receiving element 220 are amplified and transmitted to a sampling circuit 256 which under the direction of a timing circuit 257 samples the amplified signals at predetemined times, preferably two separate times, relative to the transmitted signal.

The sampled signals are then transmitted to an analyzing circuit 258. In the preferred embodiment, the analyzing circuit 258 is composed of at least one and preferably two initial lookup circuits 260, where the sampled signals from the first element 218 and second element 220 are compared to stored value ranges representative of tubing containing known source solution types. Output from the initial lookup circuits 260 is transmitted to a second lookup circuit 264 which also compares the signals to stored value ranges representative of known source solution types. At least one of the initial lookup circuits 260 and second lookup circuit 264 contains a stored value range corresponding to a tube containing air and the sampled signals are also compared to this range.

If the signals fall within the value ranges stored in at least one of the initial lookup circuits 260 and second lookup circuit 264, a code representative of the corresponding compound fluid type is transmitted to the controller 48. If the signals do not fall within the stored value ranges, an indicative code is returned to the controller 48. If the code indicative of any unidentified fluid type is received, the controller 48 preferably generates an alarm.

Many of the operational steps of compounding a solution are described in the U.S. Pat. Nos. 4,653,010 and 4,513,796 noted above, with the disclosures of these patents incorporated by reference herein. The present invention, however, significantly enhances the efficacy of these described methods.

For example, upon starting of the pumping device 12, the controller 48 will check the specific gravity for each of the fluids being pumped by the pumping device with the range of specific gravity for that type of fluid. As noted above, the specific gravity and fluid solution type are both input into the controller 48 for each of the fluids to be pumped. The controller 48 also contains ranges of specific gravity values for the different types of component fluids 20. Upon pushing of the start button 107, the controller 48 compares the specific gravity input into the controller for each of the fluids which are to be pumped by the pumping device 12 to the stored range of specific gravity for that component fluid type. If the input specific gravity does not fall within the stored range, an alarm will sound and the station 58 having the mismatched specific gravity will blink.

Figure 6:
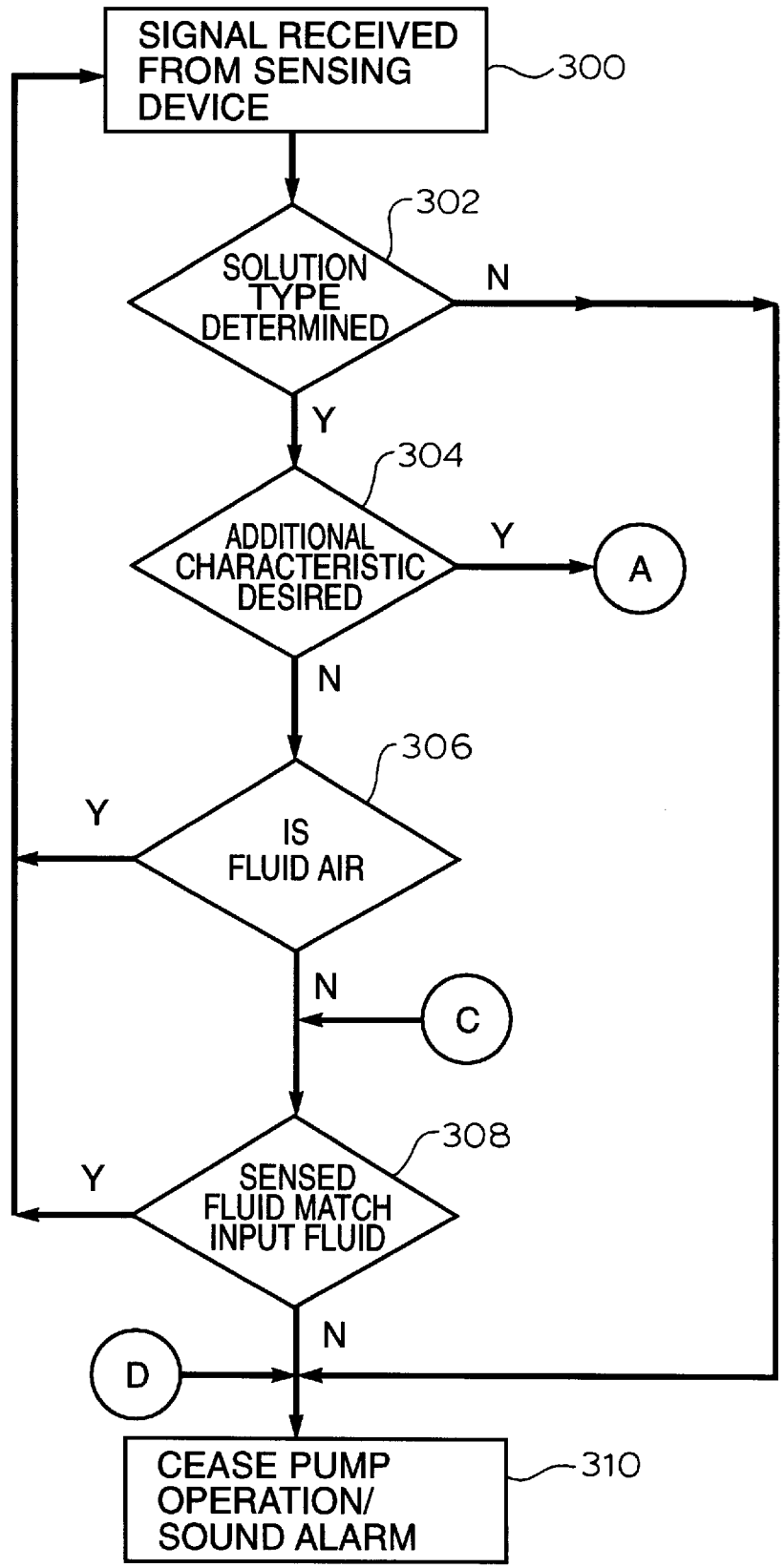
FIG. 6 is a flow chart illustrating at least part of a preferred method for identification of a distinguishing characteristic of a component fluid which is to be transferred by the apparatus of FIG. 1.
Figure 7:
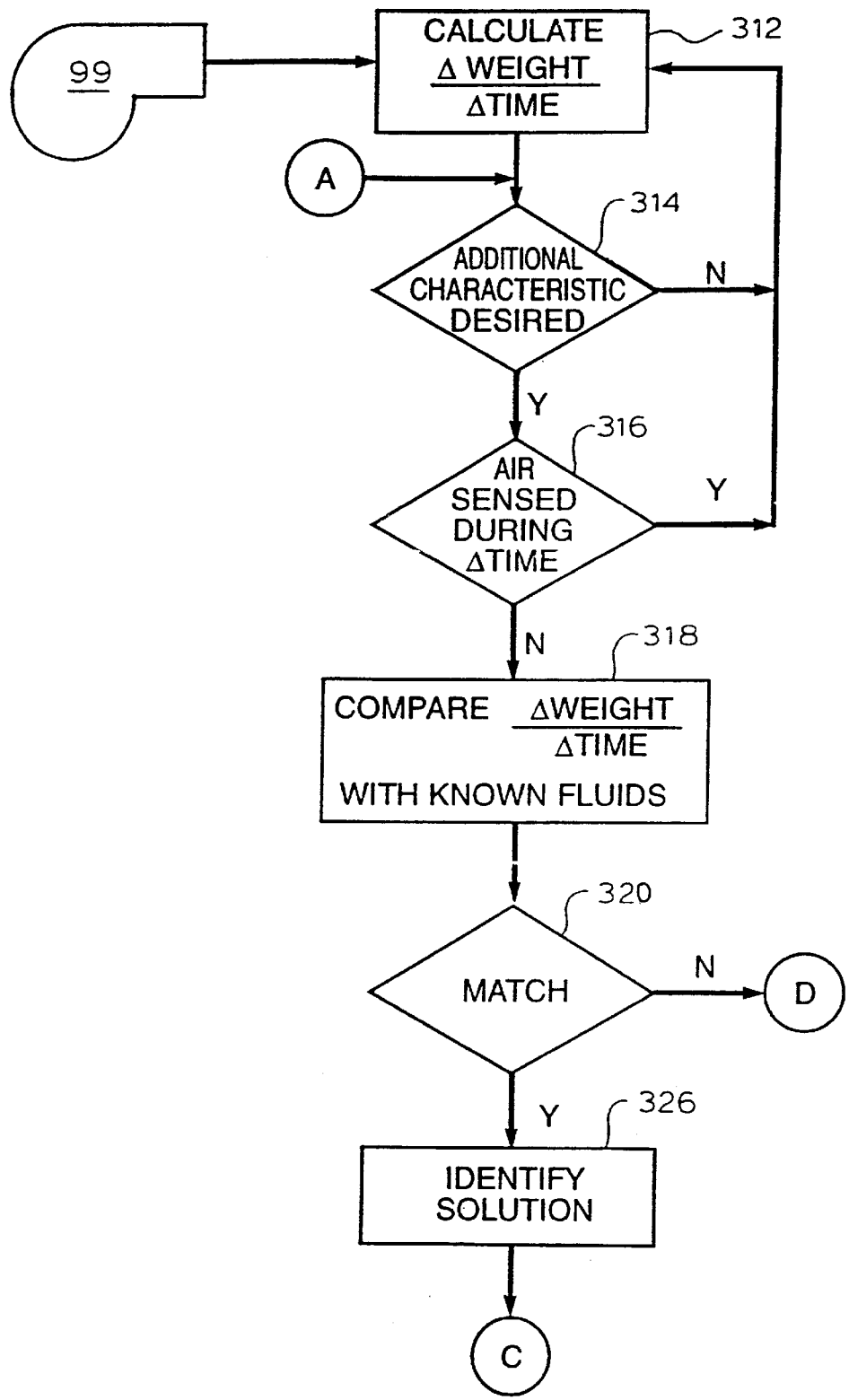
FIG. 7 is a flow chart illustrating at least part of a preferred method for identification of a second distinguishing characteristic of a component fluid which is to be transferred by the apparatus of FIG. 1.

Referring to FIGS. 1, 6 and 7, a preferred method for utilizing the sensing assembly 200 and weight sensor 99 (FIG. 1) is illustrated. The sensing assembly 200 supplies a signal to the controller 48 (FIG. 2) indicating the type of fluid within the segment of tube 44 extending through the housing 202, as illustrated by block 300 in the figure.

The controller 48 then determines if the signal indicates that a solution type was identified by the sensing assembly 200 as shown in decision diamond 302. If the solution type was not identified, the controller 48 stops operation of the fluid transfer assembly 10 and sounds an alarm. Referring briefly to FIG. 2, the alarm may be muted by pushing a stop/mute button 109 on the control panel 50.

As illustrated by decision diamond 304, if the solution type is identified by the sensing assembly 200, the next step is to determine if the sensed fluid type is one of those types of fluids, for example dextrose and branch chain amino acids, for which an additional distinguishing characteristic is desired.

If the additional distinguishing characteristic is not desired, a determination is made whether the sensed type of fluid is air. If the sensed type of fluid is air, as represented by decision diamond 306, the assembly 10 continues in a normal operation and the process is repeated by the supply of the next signal 300 from the sensing assembly.

If the sensed fluid is not air, a comparison is made between the sensed type of fluid and the type of fluid which is to be expected from the source container 16 which is connected to the tubing 44 being sensed, as illustrated by decision diamond 308. The type of fluid in that source container 16 and which is to be transferred by the pump 26–36 corresponding to the channel 208a–f had been previously input into the controller 48, as described above. If the sensed type matches the input type, the compounder 12 continues in a normal operation and the process is repeated by the supply of the next signal 300.

If however, the sensed type of fluid does not match the input type of fluid, the respective pump 24 ceases operation, and an alarm is sounded and displayed on the front face of the panel 54 (FIG. 2), as represented by block 310. The display of such an alarm state, is preferably achieved by blinking the displayed digits on the corresponding display station 58 for that fluid and an error message such as "incorrect solution" is displayed on the error display 78.

Referring to FIGS. 1 and 7, during pumping and using input from the weighing sensor 99 the change of weight of the container 18 and contents of the container over a predetermined time interval is repeatedly calculated by the controller 48. It has been found that a time interval of 3 seconds provides satisfactory results, although other time intervals may also prove satisfactory. The change of weight calculating step is represented by block 312.

Based on the input supplied by decision diamond 304, the controller 48 determines if the additional identifying characteristic for the fluid identified by the sensing assembly 200 is desired, as indicated by decision diamond 314. If no additional characteristic is desired, the controller returns to the weight change calculating step.

If the additional characteristic is desired, a determination is made as to whether the sensing assembly 200 has detected air in the tubing over the predetermined time interval during which the change of weight has been calculated. This air detection step is represented by decision diamond 316. As can be appreciated, air flowing within the tubing 44 may cause the change of weight of the container 18 and contents to be different than that which would have occurred had there been liquid flow during the entire period. Thus, the weight change may not be indicative of the flow rate of a particular liquid.

If air in the tubing 44 is detected during the time interval over which the change of weight of container 18 is examined, the controller returns to calculating the change of weight per unit of time.

If air has not been detected, the controller 48 compares the weight change with a lookup table of weight changes for a comparable unit of time for various potential component fluids, as represented by block 318. As indicated by decision diamond 320, if the weight change is within a range of stored weight change values for a particular source solution which matches one of the possible source solutions as indicated by the sensing assembly 200, that type of solution is identified, as indicated in block 326, otherwise an alarm is returned.

Referring also to FIG. 6, the identified solution is then compared with the input solution type as represented in decision diamond 308, described above. If there is no match, the assembly 10 ceases operation and the alarm is sounded. If there is a match the assembly continues normal operation.

Thus it can be seen, that the controller 48 forming a part of the mixing assembly 10 utilizes inputs from the sensing assembly 200, and possibly the weighing sensor 99 to distinguish or identify the type of solution flowing through the particular tubing 44 and into the collection container 18. The identified solution is then compared with or checked against the solution type which has been input into the controller 48 for a particular pump 26–36, typically by the operator or remote controller 80. If the types do not match, an alarm condition is sounded and the assembly 10 ceases operation.

Other methods of sensing an additional distinguishing characteristic of the transferred fluid are also included in the present invention. For example the operation of a volumetric pump may be dependent on the type of fluid being pumped. Thus by monitoring the operation of the pump, the additional characteristic may be identified.

Referring to FIGS. 1 and 3, it should be understood that the controller 48 may be remotely located relative to the housings 38a and 38b. Signals may be transmitted by a number of ways between the sensing assembly 200, the controller 48, the load cell 100 and the housings 38a and 38b. Hard wiring is one such way. Another envisioned way is by infrared or radio transmission. Also, the controller 48 may be configured to directly output or cause the output of the signal to the transmitting electrode 216 and read the signal detection inputs from the receiving electrodes 218, 220. The controller 48 may then perform the identification method on the respective signals.

Referring also to FIG. 4, before start up a calibrating fixture (not shown) similar in shape to the tubing 44 may be inserted into one of the channels 208. A calibration button 113 (FIG. 2) may be pressed and the sensing assembly 200 sends a response to the controller 48 which indicates the proper functioning of the sensing assembly 200.

In the preferred method, upon the initial starting of the assembly 10, the sensing assembly 200 identifies the fluids within all of the tubing which extend through the channels 208. Because the fluid within a particular tubing 44 may not be flowing initially, flow rate identification is not performed. The types of solutions identified by the sensing assembly 200 are compared with the input types of solutions for the corresponding pumps 26–36 and an alarm is sounded if a mismatch is found.

Because there is no flow at start up, if the solution identified by the sensing assembly 200 is one for which the second identification method is normally performed, that second method is not performed and instead the controller 24 checks the indicated solution type against the plurality of possible solution types. If a match is found among the plurality, the assembly 10 continues normal operation.

After initial start up and fluid is being pumped through the tubing 44, the controller 48 identifies the fluid or air in the tubing 44 through which a fluid is flowing, using inputs from both the sensing assembly 200 and, if necessary, the weight change as detected by the weighing sensor 99, as described above. The identified solution type is then matched against the input solution type.

If a mismatch is found, either during initial startup or subsequent operation, the alarm is sounded. The operator then checks to insure that the proper source container 16 is connected to the station 58 displaying the alarm condition. The operator may also check to see if the right solution type has been input into the station 58.

In the preferred method of operation of the present invention includes examining the input from the weighing sensor 99 only when the sensing devices 200 determines that the type is one or more of a subset of possible solution types. In other embodiments, the present invention may also include utilizing the input from the weighing sensor 99 regardless of the solution type sensed by the sensing device 200.

It is envisioned that there may be instances where the source solution is correct, and the type of solution may be input correctly into the system, and yet the controller 48 generates a solution mismatch alarm. One example of such an occurrence, is when the source solution container 16 having a particular solution type is correctly replaced with a container having another type of solution, and the new input solution type is correctly input into the controller 48. Fluid from the first solution type may still be in the tubing 44 with the old solution being sensed by the sensing assembly 200, thereby generating the alarm.

Referring to FIGS. 1 and 2, to overcome such an alarm, the transfer set 14 is flushed by depressing the flush switch 110 on the front face 54 of the control panel 50. The pump 26–36 corresponding to the alarming station is activated for a brief period or until the new solution is detected, to flush the tubing 44. If the correct solution type is then identified, the compounding may be restarted. The collection container 18 is then discarded, as indicated to the controller 48 by the removal of the weight from the load cell 100. A new collection container 18 is then hung from the load cell 100, and the compounding process is restarted.

The controller 48 may also be configured so that it compares the contents of the tubing 44 relative to the operation of one of the pumps 26–36 to sense a free flowing condition. For example, if the controller 48 receives from the sensing assembly 200 designating an empty tubing 44 and then at a later reading receives a code designating liquid in the tubing without the corresponding pump being in operation, a free flow condition may be identified.

Figure 8:
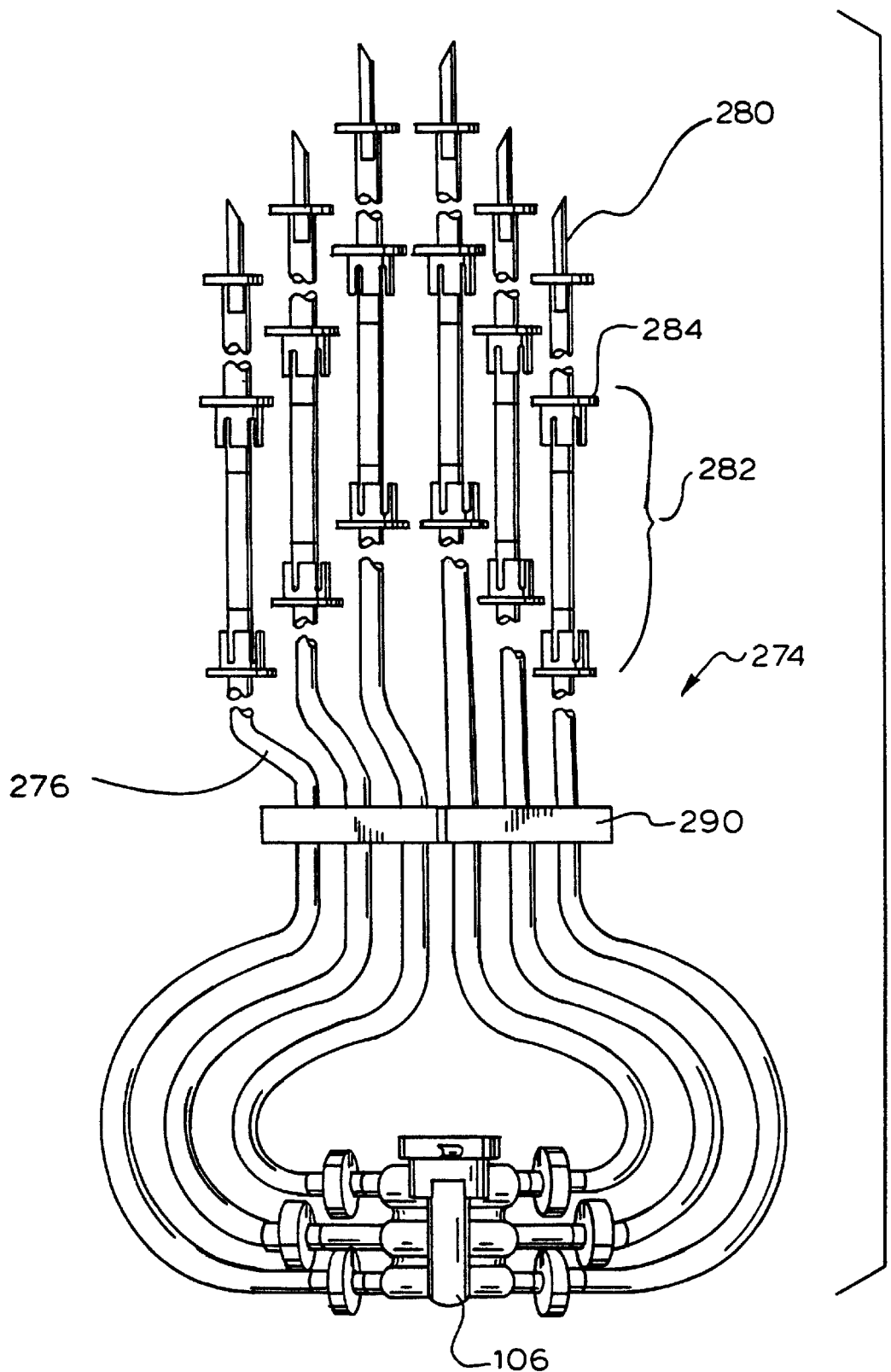
FIG. 8 is a preferred embodiment of a transfer set adapted for use with the transfer apparatus of FIG. 1.

Referring to FIG. 8 in conjunction with FIG. 1, the preferred embodiment of a combining portion 274 of the transfer set 14 which finds particular application with the compounder 12 and sensing assembly 200 is illustrated. The combining portion 274 includes a plurality of tubing segments 276, One end of each of the tubing segments 276 may be connected to one of source container 14. Preferably, attached to one end of the tubing 276 are connectors 280 for removably connecting to source containers 14. In the preferred embodiment, the connectors 280 are spikes for accessing ports forming a part of a flexible solution container.

An intermediate portion 282 of the tubing segments 276 is uniquely configured for operative attachment to one of the pumps 24 and includes retainers 284 to maintain the operative attachment between the tubing 276 and pumps during operation. To facilitate the proper attachment of the transfer set 14 to the compounder 12, the connector 280 and retainers 284 on a particular one of the tubing segments 276 are color coded to match the color coding on the display station 58 on the control panel 50. The color coding is also applied to an entry port 57 of the pump 26–36 that is operatively connected to a single color coded display station 58.

The opposite ends of each of the tubing 276 are connected to the junction manifold 106. As can be appreciated, ensuring that a tube extending from a particular pump 26–36 is threaded through the proper channel 208 is important or there will be a mismatch between the fluid sensed by the sensing assembly 200 and the type of fluid input for that particular pump.

Figure 9:
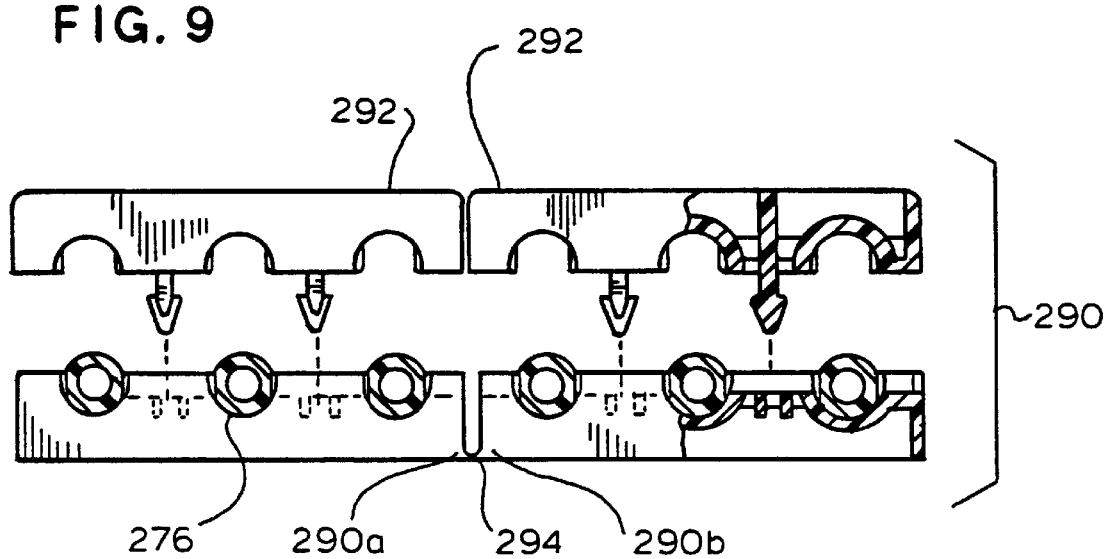
FIG. 9 is a top planar view with parts broken away of a bracket forming a part of the transfer set of FIG. 8.
Figure 10:
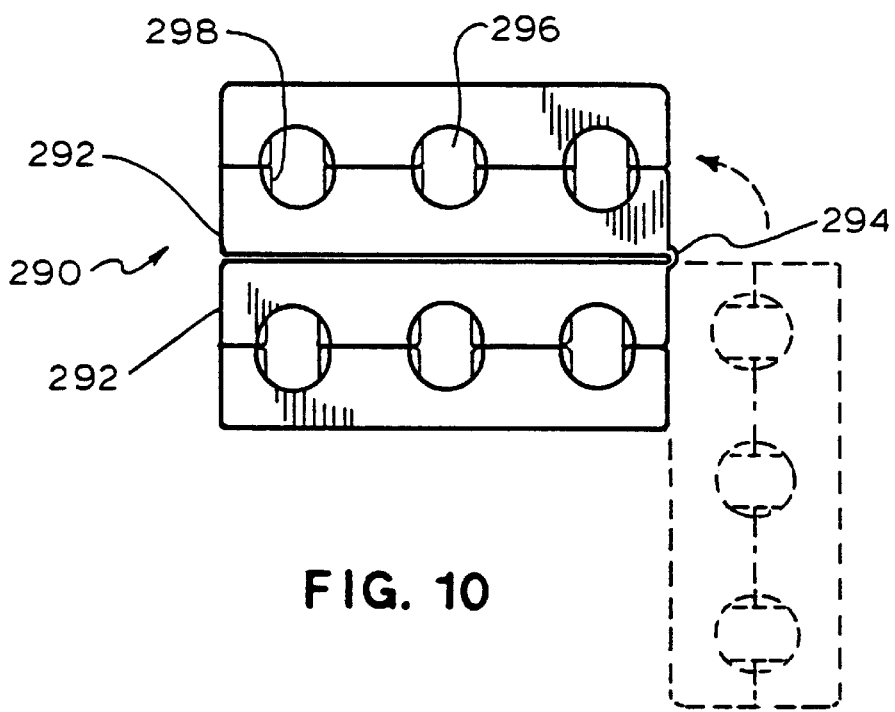
FIG. 10 is a top planar view of the bracket of FIG. 8 illustrating the movement of the bracket.

Referring also to FIGS. 9 and 10, to arrange the various tubing 44 so that the individual tubing is placed in the proper corresponding channel 208*a–f* a bracket 290 is provided. The bracket 290 retains the individual tubing segments 276 in a predetermined arrangement relative to each other. The bracket 290 preferably is formed as two similarly configured portions 292 holding an equal number of tubing. The portions 292 are connected to each other by a living hinge 294 attached to a rear corner 292*a* of one of the portions 292 and the opposing rear corner 292*b* of the other portion.

The hinge 294 allows the bracket 290 to fold so that the portions 292 extend along each other to facilitate packaging of the combining portion as particularly shown in FIG. 10. In addition, the hinge 294 allows the portions 294 to be unfolded to a position where the portions are generally aligned with each other and an abutting interference between the two portions 292 prevents further unfolding as shown in FIG. 9. The bracket 290 forms passageways 296 for the tubing 276. Opposing teeth 298 are formed within the passageways 296 to clamp the tubing 276 and prevent slippage of the tubing 276 relative to the bracket 290.

The bracket 290 is important in facilitating the attachment of the connection portion 274 of the transfer set 14 to the pumping device 12. As noted previously, each of the channels 208 (FIG. 4) corresponds to a particular pumping station 26–36 to which a component fluid 20 has been identified by input to the controller (FIG. 2). If the proper tubing segment 276 is not inserted into the proper channel as the component fluid flows through the tubing and improper channel 208 where the fluid is sensed by the sensing assembly 200, a nuisance alarm will be generated.

The bracket 290 makes it very difficult to inadvertently place the wrong tubing segment in a channel 208. The bracket 290, in the unfolded position aligns the tubing segments 276 in the proper order relative to each other. In addition, in the preferred embodiment the bracket 290 is placed at a predetermined distance d1 from the junction manifold 106 along the tubing segments 276. This distance d1 is set by the spacing s1 between the cradle 108 and at least one of the upper edge 200*a* or lower edge 200*b* of the sensing assembly 200. Preferably the distance d1 is set by the spacing between the cradle 108 and upper edge 200*a* so that when the junction manifold 106 is placed in the cradle 108, the tubing segments may be extended so that the bracket just clears the upper edge.

As noted earlier, the cradle 108 and junction manifold 106 are configured so that the junction manifold can be received in the cradle in only a desired orientation. When the junction manifold 106 is placed within the cradle 108 and the tubing segments 276 between the bracket 290 and junction manifold are extended so that the bracket clears the upper edge 200*a*, the proper alignment of the tubing segments becomes self evident. Orienting the bracket 290 in the opposite direction, causes a corkscrewing of the tubing which reduces the effective length of the tubing so that the junction manifold 106 cannot be received in the proper orientation in the cradle 108. In addition, a sideways displacing of the bracket 290 relative to the sensing assembly 200 in either direction, will cause at least one of the tubing segments 276 to not be received in a corresponding channel 208. This "orphaned" tubing segment will then interfere with the closing of the sensing assembly which indicates the misplacement.

Following this description is a printout of the computer code in assembler language for practicing the preferred method of the present invention.

While a particular embodiment of the fluid transfer assembly of the present invention has been shown and described, it will be appreciated by those skilled in the art that changes and modifications may be made thereto without departing from the invention in its broadest aspects and as set forth in the following claims.

What is claimed is:

1. An assembly adapted for the attachment of a transfer set thereto and for controllably transferring fluids from a Plurality of individual source containers through the transfer set to form a desired mixture in a receiving container, the transfer set being in fluid communication with the source containers and the receiving container, the assembly comprising:

a pump adapted to operatively act on at least one of the fluids to force a flow of said fluid along a portion of the set, the rate of the flow varying in at least partial dependence on a characteristic of said fluid;

a fluid type sensor adapted to receive a portion of the set and in noninvasive sensor contact with the fluid flowing within the set, said fluid type sensor including a first sensor adapted to transmit a signal into the set, a second sensor adapted to receive from the set the signal transmitted by said first sensor to determine a type characteristic of the fluid, said fluid type sensor providing a first output indicative or said type characteristic;

a flow rate distinguishing sensor in operative contact with the receiving container and providing a second output indicative of said flow rate;

a controller receiving said first input from said fluid type sensor and said second input from said distinguishing sensor, the controller being configured to determine the fluid type from a plurality of said at least three possible fluid types utilizing said first input from said type sensor and utilizing said second input from said distinguishing sensor.

2. An assembly adapted for the attachment of a transfer set thereto and for controllably transferring fluids from a plurality of individual source containers through the transfer set to form a desired mixture in a receiving container, the transfer set being in fluid communication with the source containers and the receiving container, the assembly comprising:

a pump adapted to operatively act on at least one of the fluids to force a flow of said fluid along the set, the rate of the flow varying in at least partial dependence on a characteristic of said fluid;

a fluid type sensor adapted to receive a portion of the set and in noninvasive sensor contact with the fluid flowing within the set, said fluid type sensor including a first sensor adapted to transmit a signal into the set, a second sensor adapted to receive the signal transmitted by said first sensor and determine a type characteristic of the fluid, said fluid type sensor providing a first output indicative or said type characteristic;

a flow rate distinguishing sensor in operative contact with the receiving container and providing a second output;

a controller receiving said first input from said fluid type sensor and said second input from said distinguishing sensor, wherein the controller is configured to determine the fluid type from a plurality of said at least three possible fluid types utilizing said first input from said type sensor and only utilizing said second input from said distinguishing sensor when said type sensor does not detect air as one of the fluid types detected during a predetermined time interval.

3. A method for distinguishing a first fluid component from at least one second component during the mixing of the first and second components in a collection container, wherein the first fluid component and second component flow along a transfer set, said transfer set including a first tubing segment adapted to provide a fluid passageway for the first fluid component and a second tubing segment adapted to provide a fluid passageway for the second fluid component, the method comprising:

placing the first tubing segment in close proximity to a first noninvasive sensing means for identifying a first distinguishing characteristic of both the first component fluid and the second component fluid;

establishing fluid communication between the transfer set and the collection container, pumping one of the first component fluid and second component fluid through the transfer set;

sensing said distinguishing characteristic of the pumped fluid with said sensing means; and determining a second distinguishing characteristic of the pumped fluid, said determining step including correlating the flow rate of the pumped fluid to one of the flow rate of the first component fluid and second component fluid under similar pumping conditions.

4. The method of claim 3 wherein said determining step includes performing said determining step in at least partial dependence on the distinguishing characteristic sensed in said sensing step.

5. The method of claim 3 further including first identifying a component solution type prior to said pumping, and performing said determining step based on whether said sensing step identifies said first identified component solution.

6. The method of claim 3 further including first identifying a component solution type prior to said pumping, wherein said determining step includes determining whether said pumped fluid is one of said first component fluid and said second component fluid based on both said sensing and said first determining step when said distinguishing characteristic from said determining step correlates to said first identified solution.

7. The method of claim 3 further including first identifying a component solution type prior to pumping;

second identifying a component solution type in at least partial dependence on said distinguishing characteristic from said sensing step; and maintaining said pumping only if said first identified solution type matches said second identified solution type.

8. The method of claim 3 further including first identifying a component solution type prior to said pumping;

second identifying a solution type from said sensing step and said determining step; and maintaining said pumping only if said first identified solution type matches said second identified solution type.

9. A transferring assembly for controllably transferring a first component fluid through a first tubing segment to a collection container and a second component fluid through a second tubing segment to the collection container, the first tubing segment and second tubing segment being in fluid communication with the collection container, the transferring assembly comprising:

a first pump adapted to receive the first tubing segment and to pump the first component fluid through the first tubing segment a second pump adapted to receive the first tubing segment and to pump the second component fluid through the second tubing segment;

first sensing means disposed in close proximity to the first tubing segment for noninvasively sensing a distinguishing characteristic of the first component fluid within the first tubing segment;

a second sensing means disposed in close proximity to the second tubing segment for noninvasively sensing a distinguishing characteristic of the second component fluid within the second tubing segment;

a controller adapted to receive a signal from said first sensing means and a signal from said second sensing means; and third sensing means for noninvasively distinguishing the flow rate of the first component fluid when the first component fluid is pumped by the first pump, said controller adapted to receive a signal from said third sensing means.

10. The transferring assembly of claim 9 wherein the fluid sensed by said first sensing means includes air.

11. The transferring assembly of claim 10 further including means utilizing the distinguishing characteristic from said first sensing means for determining the possible fluid types having matching distinguishing characteristics.

12. The transferring assembly of claim 11 wherein the determining means includes means utilizing the distinguishing characteristic supplied by the first sensing means for determining whether to utilize the distinguishing characteristic sensed by said third sensing means.

* * * * *